April 28, 1942.  M. LEHMANN ET AL  2,281,004
INDUSTRIAL TRUCK
Filed Sept. 3, 1940  3 Sheets-Sheet 1

INVENTORS.
MAX LEHMANN
PAUL R. GUERIN
BY Hull, West & Chilton
ATTORNEYS.

April 28, 1942.  M. LEHMANN ET AL  2,281,004
INDUSTRIAL TRUCK
Filed Sept. 3, 1940  3 Sheets-Sheet 2
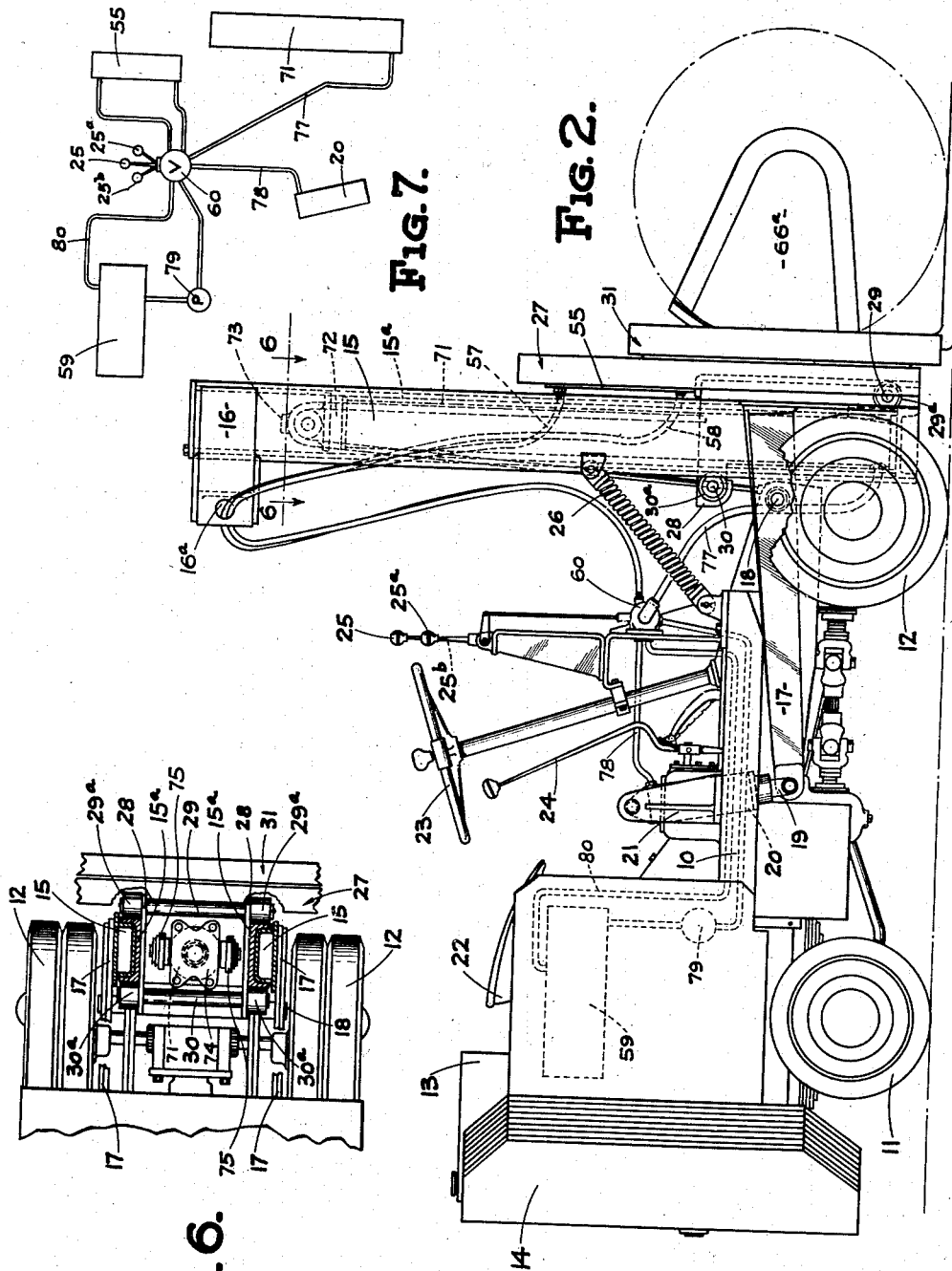
INVENTORS.
MAX LEHMANN
PAUL R. GUERIN
BY Hull, West & Chilton
ATTORNEYS.

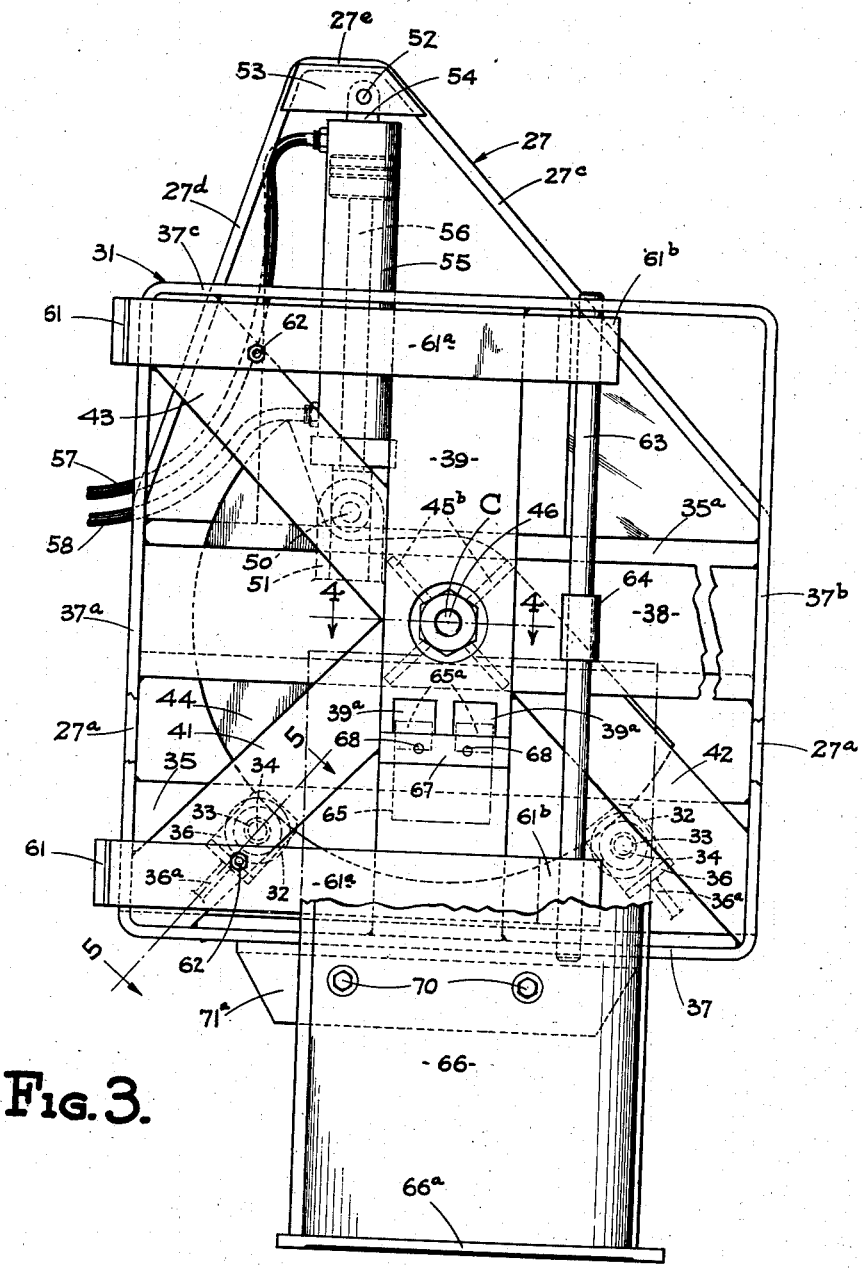

Patented Apr. 28, 1942

2,281,004

UNITED STATES PATENT OFFICE 2,281,004

INDUSTRIAL TRUCK

Max Lehmann, Cleveland, and Paul R. Guerin, East Cleveland, Ohio, assignors to Towmotor Co., Cleveland, Ohio, a copartnership consisting of Lester M. Sears, Ruth P. Sears, and Mary Ann Sears, all of Shaker Heights, Ohio, and Anna L. Sears, Cleveland, Ohio Application September 3, 1940, Serial No. 355,166

8 Claims. (Cl. 214—113)

This invention relates to industrial trucks, and more particularly to means carried by said trucks for receiving and raising a load and for changing the position of said load prior to depositing the same. It is the general object of our invention to provide simple and effective power mechanism for raising a load carrier along a boom or mast, for tilting the said boom or mast to facilitate the transportation of the load, and for changing the position of the load carrier prior to depositing the load. A further object of the invention is to enable all of these operations to be readily and effectively controllable by the operator.

A still further object of the invention is to provide hydraulically operated means for effecting the lifting of the load carrier, the tilting of the boom or mast with reference to which the load carrier is raised and lowered, and for imparting a rotary movement to the load carrier to facilitate depositing the load carried thereby in a desired position or location.

Figure 1:
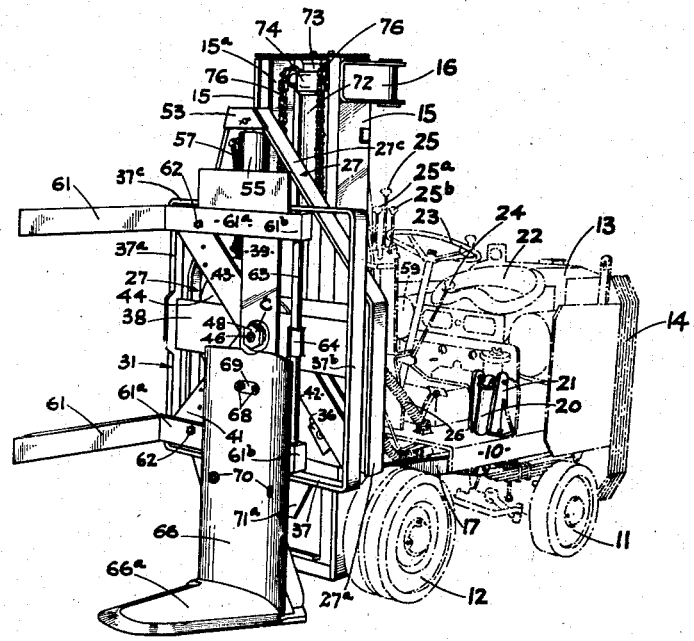
Figure 4:
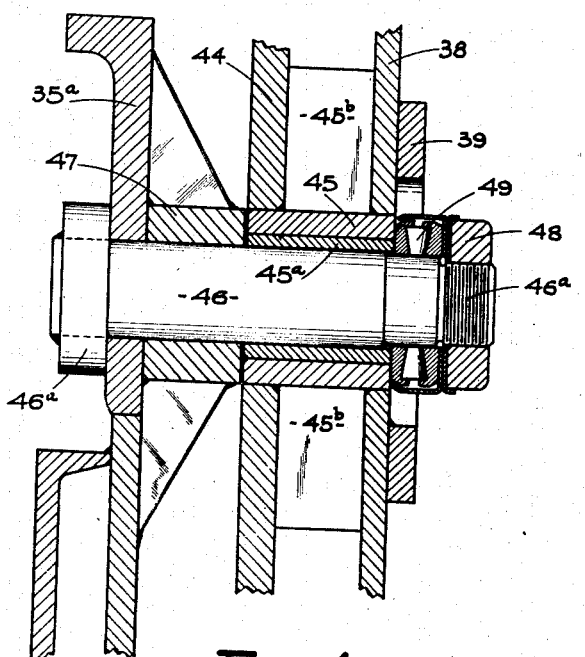
Figure 5:
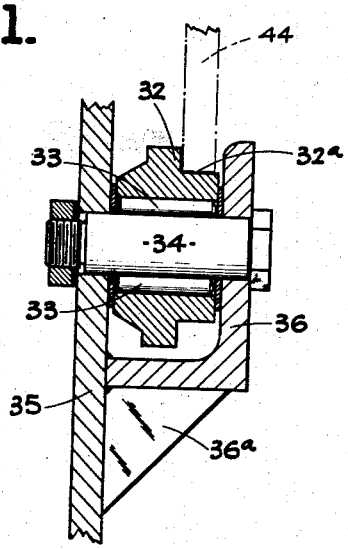

Further and more limited objects of the invention will be set forth in the specification and will be realized in and through the construction and arrangement of parts shown in the drawings hereof wherein Fig. 1 represents a perspective view of an industrial truck having my invention applied thereto, the portions of the truck at the rear of the mast or boom being shown in dot-and-dash lines; Fig. 2 a side elevation of the truck shown in Fig. 1, with parts broken away; Fig. 3 an enlarged detail in front elevation of the load carrier and the means for rotating the same, the lower portion of the scoop being shown in full lines and the upper portion of the scoop being shown in dot-and-dash lines; Fig. 4 an enlarged detail in section taken on the line 4—4 of Fig. 3; Fig. 5 a similar detail in section taken on the line 5—5 of Fig. 3; Fig. 6 a detail in section taken on the line 6—6 of Fig. 2; and Fig. 7 a diagrammatic view of the means for controlling the supply of hydraulic fluid to and from the cylinders employed in operating various parts of our apparatus.

Describing by reference characters the parts illustrated herein, 10 denotes generally the body frame of an industrial truck having rear steering wheels 11 and front wheels 12 driven by suitable connections (shown in Fig. 2) from an internal combustion engine within the hood 13 on the rear of the frame, the radiator of the said engine being protected by plates 14 which also serve to counterbalance the mast and the load carrier and load. 15 denotes the outer side members of a mast or boom, the said members being preferably of approximately box-girder section and having their upper ends connected by a transverse brace member 16. Extending rearwardly from and rigidly connected to the lower portion of each of the side members 15 is an arm 17, which is pivoted upon a cross shaft 18, and the rear end of each arm is pivotally connected with a piston rod 19 projecting from a hydraulic cylinder 20, the upper end of which is pivotally supported between upright brackets 21 mounted upon the frame 10.

The truck body is also provided with the operator's seat 22, steering wheel 23, gear shift lever 24 and control levers 25, 25$^a$ and 25$^b$ for controlling the supply of operating fluid to the cylinders 20 and the cylinders by which the load carrier is raised and lowered and the load supporting portion thereof is rotated about its axis.

26 denotes springs located on opposite sides of the truck and having their lower ends connected to the frame 10 and their upper ends connected to the respective side members 15. These springs serve to assist the forwardly projecting portions of the load carrying members on the front of the said uprights in returning the latter to a vertical position when operating fluid is released from the cylinders 20.

The load carrier comprises generally an up-ender carriage, indicated generally at 27 and provided with cheek pieces 28 carrying shafts 29 and 30 having rollers 29$^a$ and 30$^a$ thereon and engaging respectively the front and rear surfaces of the upright mast extension members 15$^a$ (which are preferably of channel section and are slidably mounted on the upright members 15), means including a hydraulic cylinder mounted between the upright mast members 15 and 15$^a$ for raising and lowering the up-ender carriage, and a swinging carriage indicated generally at 31, which is rotatably mounted upon and vertically movable with the up-ender carriage and which is provided with angularly spaced supporting members for a load; with a hydraulic cylinder carried by the up-ender carriage and having a piston rod connected with the swinging carriage whereby the latter may be rotated about the substantially horizontal axis by which it is mounted upon the up-ender carriage.

Up-ender carriage

The up-ender carriage as shown herein, is in the form of a frame in the shape of an irregular hexagon having a wide base plate 35, substantially parallel sides 27$^a$, upwardly convergent sides 27$^c$, 27$^d$, and a short upper side 27$^e$ which is shown as substantially parallel with the base plate. It will be noted that the side 27ᶜ is considerably longer than the side 27ᵈ whereby the member at the top of the hexagonal frame will be considerably offset from a vertical line extending midway between the sides 27ᵃ. The purpose of this construction is to provide a location for the support of the upper end of the hydraulic cylinder by which rotary movement is imparted to the swinging carriage, thereby to enable the piston to be conveniently connected to the swinging carriage at a point offset from the center of rotation of the latter.

The up-ender carriage frame is provided with rollers 32 each mounted on a roller bearing 33 surrounding a stub shaft 34 which is mounted at one end in the plate 35 extending across the lower portion of the up-ender carriage frame and at its other end in an angle bracket 36 secured to said plate (preferably by welding), each bracket being shown as provided with a reinforcing rib 36ᵃ. The rollers 32 are located at and above corners formed by the junction of the bottom of the frame with the sides of the same, with their supporting surfaces 32ᵃ equidistantly spaced from the center of rotation C, of the swinging carriage.

Swinging carriage

The swinging carriage comprises generally a rectangular frame 37, 37ᵃ, 37ᵇ, 37ᶜ, preferably of substantially the same width as the width of the up-ender carriage frame 27. 38 denotes a cross plate located midway between the top and bottom of the frame and connecting the opposite sides thereof; and 39 denotes a plate located in front of the plate 38 and connected to the top and bottom members of the carrier, midway between the sides. In addition, diagonal angle braces 41 and 42 extend from the central portion of the swinging carriage to the lower corners of the frame, and a similar diagonal brace 43 extends from one of the upper corners of the frame to the central portion thereof. 44 denotes a semicircular rocker track by which the swinging carriage is rotatably supported in part by the rollers 32. The central portions of the members 38 and 39 and the rear rocker track 44 are mounted upon a metallic hub 45 (see Fig. 4) which has therewithin a bushing 45ᵃ surrounding a stub shaft 46. This stub shaft projects rearwardly through a hub member 47 carried by the central transverse member 35ᵃ of the frame of the up-ender carriage, being provided with a head 46ᵃ engaging the read side of the member 35ᵃ. The front end of the shaft 46 is threaded, as shown at 46ᵃ, and is provided with a nut 48 thereon, a tapered roller thrust bearing 49 being interposed between the rear face of the nut and the front ends of the hub and bushing. 45ᵇ denotes radial bracing ribs carried by the hub 45 between the elements 38 and 44.

50 denotes a pin carried by a bracket 51 secured to the rocker track 44 at the left of the center of rotation of the swinging carriage, the said pin and bracket projecting rearwardly from the said track. When the parts are in the positions shown in Figs. 1 and 3, the pin 50 is immediately below a pin 52 mounted in plates 53 extending across the top of the up-ender carriage, the said pin 52 providing a pivotal support for a lug 54 projecting from the top of the hydraulic cylinder 55, the piston rod 56 whereof is connected to the pin 50. The cylinder is provided with the supply pipes 57 and 58 by which the hydraulic fluid may be supplied to opposite ends of the cylinder from the tank 59. The valve mechanism for controlling the supply of fluid from the tank to the opposite ends of the cylinder and for returning the fluid to the tank may be located within a casing indicated at 60. The pipes 57 and 58 may in practice be supported by extending the same through an opening 16ᵃ provided therefor in the transverse bracing member 16.

61 denotes a pair of forks each projecting at substantially right angles from a base 61ᵃ, which bases are secured to the angle braces 41 and 43, adjacent to the forks proper, by bolts 62. The opposite or inner end of each base 61ᵃ is provided with an enlargement or hub portion 61ᵇ for the reception of a rod 63, which extends through an anchoring sleeve 64 provided on the transverse brace 38. The opposite ends of the rods extend through and are anchored in the opposed portions 37 and 37ᶜ of the frame of the swinging carriage frame.

The brace plate 39 is provided, below the stud shaft 46, with a pair of openings 39ᵃ for the reception of rearwardly projecting hooks 65ᵃ formed on and projecting rearwardly from a brace plate 65 which is secured, as by welding, to the rear surface of the upper portion of the scoop body 66. 67 denotes a reinforcing plate which is secured to the base plate 39 below the openings 39ᵃ, and 68 denotes bolts securing the said base plate and the upper portion of the scoop body to the brace plate 39, the upper portion of the scoop body being shown as provided with an opening 69 for permitting access to the bolts. Additional bolts 70 are employed for securing the lower portion of the scoop body to an angle brace 71ᵃ secured to and projecting from the member 37 of the swinging carriage frame. 66ᵃ denotes the scoop proper which projects at right angles from the body 66.

Carriage elevating mechanism

The carriage elevating mechanism is of the general type which has been employed in connection with industrial trucks and comprises a cylinder 71, shown in dot-and-dash lines in Fig. 2, mounted between the upright side members 15 of the mast and having a piston rod 72 provided with a bumper 73 at its upper end (preferably of resilient material, such as rubber) and also provided below said end with a cross head 74, the said cross head being provided with rollers 75 over each of which there passes a chain 76 having one end secured to the base of the mast 15 and the other end secured to the up-ender carriage. The hydraulic fluid for operating the piston is supplied to the bottom of the cylinder through a pipe 77 also connected with the valve casing 60. The same is true with respect to the hydraulic fluid supplied by the pipes 78 to the tops of the cylinders 20 by which the mast is tilted about its axis 18. The valves which are located in the valve casing 60 and which control the supply of fluid therefrom to and from the cylinders 20, 55 and 71 are operated by the control levers 25, 25ᵃ, 25ᵇ, respectively. By reference to Fig. 7, it will be seen that the hydraulic fluid will be taken from the tank 59 by a pump 79 and delivered thereby to the casing 60, whence its flow to the respective cylinders 20, 55 and 71 will be controlled by the valves operated by the levers 25, 25ᵃ and 25ᵇ, respectively. 80 denotes a return pipe connecting the valve casing with the tank 59.

The valve mechanism for controlling the flow of hydraulic fluid from a casing such as 60 to the cylinders 20, 55 and 71 may be of any standard construction and, since in its details it forms no part of our invention herein, further detailed illustration of the same is unnecessary.

With the parts constructed and arranged as described, it is believed that the operation will be readily understood. Assuming that our truck is to be used for the purpose of picking up, transporting, and stacking a cylindrical object such as a roll of paper and that the swinging carriage is in a position to enable the forks 61 to extend substantially horizontally and that both carriages have been lowered sufficiently to bring the forks in close proximity to the pavement or other support on which the roll reposes, the roll will be loaded upon the forks, after which power will be applied to the cylinders 20 to tilt the mast and the carriage thereon so as to enable the rolls to rest against the back of the swinging carriages after which fluid will be supplied to the bottom of the cylinder 71 to lift the carriage to the desired height to enable the swinging carriage to be rotated 90° in a clockwise direction (to the position shown in Figs. 1 and 3) which will enable the bottom of the roll to be supported by the scoop 66ª. The roll can then be transported to the desired place for stacking on end. In the event that it is desired to stack one roll on top of another roll, this result may be accomplished by supplying additional fluid to the cylinder 71, thereby to raise the inner extensions 15ª of the uprights 15 to the desired height, and by tilting the mast thereafter forwardly to a substantially vertical position to permit convenient removal of the roll from the scoop.

Obviously, the operation may be reversed and the scoop used for picking up the load for transportation and, by rotating the swinging carriage thereafter in a counterclockwise direction, the load may be transferred from the scoop to the forks.

By making the scoop readily removable from the swinging carriage member, the truck may be used for the transportation of loads in the usual manner.

It will be obvious that due to the construction and arrangement of the parts shown herein, we have produced an industrial truck capable of realizing in an efficient manner the objects of our invention as set forth in the claims.

Having thus described our invention, what we claim is:

1. The combination with a truck, of a mast comprising a pair of substantially vertical side members pivotally supported adjacent to their lower ends by said truck for movement each about a horizontal axis, a first hydraulic cylinder mounted adjacent to each side of said truck, a piston rod extending from each cylinder, means connecting the said piston rods with the said side members for tilting the latter about their horizontal axes, a load carrier comprising a carriage mounted for reciprocation along the side members, a swinging carriage mounted upon the first mentioned carriage for rotation about a substantially horizontal axis, a second hydraulic cylinder mounted between the said side members and having a piston rod projecting therefrom, connections between the said piston rod and the first mentioned carriage for raising and lowering the same along said side members, a third hydraulic cylinder carried by the first mentioned carriage and having a piston rod, means connecting the piston rod with the swinging carriage, and means for supplying hydraulic fluid to and from the said cylinders.

2. The combination, with a truck, of a substantially vertical mast carried by the truck, a carriage mounted for sliding movement along the said mast, a carriage pivotally mounted in front of the first mentioned carriage for rotary movement thereon about a substantially horizontal axis, means for raising and lowering the first mentioned carriage along said mast, and means for rotating the second carriage with respect to the first carriage, said means comprising a hydraulic cylinder mounted upon the first mentioned carriage and having a piston rod connected to the second carriage, and means for supplying hydraulic fluid to and from said cylinder.

3. The combination, with a truck, of a substantially vertical mast carried by the truck, a carriage mounted for sliding movement along the said mast, a carriage pivotally mounted in front of the first mentioned carriage for rotary movement thereon about a substantially horizontal axis, a load carrying support comprising forks secured to the second carriage and a second load carrying support angularly spaced from the first support and detachably secured to the second carriage and provided with a load engaging scoop, and power operated means carried by the first mentioned carriage for rotating the second mentioned carriage about its pivotal support.

4. The combination, with a truck, of a substantially vertical mast carried by the truck, a carriage mounted for sliding movement along the said mast, a carriage pivotally mounted in front of the first mentioned carriage for rotary movement thereon about a substantially horizontal axis, the second carriage comprising a frame, forks secured to said frame and projecting forwardly therefrom, and a scoop having a body portion detachably secured to the said frame, the said scoop being angularly spaced from said forks, means for raising and lowering the first mentioned carriage along said mast, and power operated means carried by the first mentioned carriage for rotating the second mentioned carriage about its pivotal support.

5. The combination, with a truck, of a substantially vertical extensible mast carried by the truck, a carriage mounted for sliding movement along the said mast, a carriage pivotally mounted in front of the first mentioned carriage for rotary movement thereon about a substantially horizontal axis, the second carriage comprising a frame, a load-carrying platform secured to said frame and having its load supporting portion projecting forwardly from said frame, a second load-carrying platform spaced approximately 90° from the first platform and having its load-supporting portion spaced farther from the said axis than the load-supporting portion of the first platform, and power operated means carried by the first mentioned carriage for rotating the second mentioned carriage about its pivotal support, said power operated means comprising a hydraulic cylinder member, a piston member mounted within the cylinder member, and means connecting one of said members to the first mentioned carriage and the other of said members to the second carriage, and means for supplying operating fluid to and from the said cylinder.

6. The combination, with a truck, of a substantially vertical mast carried by the truck, a carriage mounted for sliding movement along the said mast, a carriage pivotally mounted in front of the first mentioned carriage for rotary movement thereon about a substantially horizontal axis, a pair of angularly spaced load-engaging supports carried by the second carriage, the first mentioned carriage having rollers equidistantly spaced from the axis of rotation of the second carriage and the second carriage being provided with an arcuate track portion adapted to ride upon said rollers, and power-operated means for imparting rotary movement of the second carriage about its axis.

7. The combination, with a truck, of a substantially vertical mast carried by the truck, a carriage mounted for sliding movement along the said mast, a carriage pivotally mounted in front of the first mentioned carriage for rotary movement about a substantially horizontal axis, the first mentioned carriage having rollers equidistantly spaced from the axis of rotation of the second carriage and the second carriage being provided with an arcuate track portion adapted to ride upon said rollers, a hydraulic cylinder mounted upon the first carriage, a piston rod extending from the said cylinder and pivotally connected to the second carriage at a point spaced from its axis of rotation, means for supplying hydraulic fluid to and from opposite ends of the cylinder, and angularly spaced load carrying supports carried by the second carriage.

8. The combination, with a truck, of a substantially vertical mast carried by the truck, a carriage mounted for movement along the mast, means for raising and lowering the said carriage along the said mast, a carriage pivotally mounted in front of the first mentioned carriage for rotary movement thereon about a substantially horizontal axis and having a pair of load-engaging supports spaced approximately 90° apart, and means for rotating the second carriage with respect to the first carriage, the said means comprising a hydraulic cylinder mounted on one of the said carriages and having a piston rod connected with either of said carriages, and means for supplying hydraulic fluid to and from said cylinder.

MAX LEHMANN.
PAUL R. GUERIN.